(12) United States Patent
Swaine (10) Patent No.: US 11,934,320 B2
(45) Date of Patent: Mar. 19, 2024

(54) TRANSLATION LOOKASIDE BUFFER INVALIDATION

(71) Applicant: Arm Limited, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/753,345

(22) PCT Filed: Aug. 26, 2020

(86) PCT No.: PCT/GB2020/052042
§ 371 (c)(1),
(2) Date: Feb. 28, 2022

(87) PCT Pub. No.: WO2021/048523
PCT Pub. Date: Mar. 18, 2021

(65) Prior Publication Data
US 2022/0327062 A1  Oct. 13, 2022

(30) Foreign Application Priority Data
Sep. 10, 2019  (GB) ..................... 1913044

(51) Int. Cl.
*G06F 12/1027*  (2016.01)
(52) U.S. Cl.
CPC .... *G06F 12/1027* (2013.01); *G06F 2212/304* (2013.01)

(58) Field of Classification Search
CPC ...................... G06F 12/1027; G06F 2212/304
See application file for complete search history.

(56) References Cited

U.S. PATENT DOCUMENTS 10,592,428 B1* 3/2020 Saidi .................. G06F 12/0891
2009/0292899 A1* 11/2009 Mansell ............. G06F 12/1009
711/207

FOREIGN PATENT DOCUMENTS

| CN | 107203411 A | 9/2017 |
|---|---|---|
| GB | 2565069 A | 2/2019 |
| WO | 2006/039643 A1 | 4/2006 |

* cited by examiner

*Primary Examiner* — Gary W. Cygiel
(74) *Attorney, Agent, or Firm* — NIXON & VANDERHYE P.C.

(57) ABSTRACT

A type of translation lookaside buffer (TLB) invalidation instruction is described which specifically targets a first type of TLB which stores combined stage-1-and-2 entries which depend on both stage 1 translation data and the stage 2 translation data, and which is configured to ignore a TLB invalidation command which invalidates based on a first set of one or more invalidation conditions including an address-based invalidation condition depending on matching of intermediate address. A second type of TLB other than the first type ignores the invalidation command triggered by the first type of TLB invalidation instruction. This approach helps to limit the performance impact of stage 2 invalidations in systems supporting a combined stage-1-and-2 TLB which cannot invalidate by intermediate address.

18 Claims, 5 Drawing Sheets

| TLBI type | invalidation conditions | | observed by? | | | |
|---|---|---|---|---|---|---|
| | address-based condition? | context-based condition? | S1 only TLB 40 | S2 only TLB 42 | S1+2 TLB (capable of lookup by IPA) 70 | S1+2 TLB (incapable of lookup by IPA) 60 |
| 1st TLBI IPAS2, Xt | ✓ (by IPA) | ✓ (match current VMID, EL1, security state) | ✗ | ✓ | ✓ (can be observed lazily by waiting for VMALLCOMB) | ✗ |
| 2nd TLBI VMALLCOMB | ✗ (invalidate all addresses) | ✓ (match specified/current VMID, EL, security state) | ✗ | ✗ | ✗ (could trigger completion of invalidates from 1st TLBI) | ✓ |
| 3rd TLBI VMALL | ✗ (invalidate all addresses) | ✓ (match specified/current VMID, EL, security state) | ✓ | ✗ | ✓ | ✓ |

TRANSLATION LOOKASIDE BUFFER INVALIDATION

The present technique relates to the field of data processing.

A data processing system may support address translation where virtual addresses specified by instructions are translated into physical addresses identifying locations in the memory system. Some systems may support a two-stage address translation, where a mapping of the virtual address to the physical address depends on stage 1 translation data for mapping the virtual address to an intermediate address and stage 2 translation data for mapping the intermediate address to the physical address. 2-stage address translation can be useful for systems supporting virtualisation because it allows multiple operating systems or virtual machines to coexist on the same physical platform with each virtual machine or operating system defining their own virtual address to intermediate address mapping using a respective set of stage 1 translation data. Each virtual machine or operating system may act in the same way as if they were the only virtual machine or operating system running on the system, as if the intermediate addresses are actually physical addresses. However, a hypervisor which controls the different virtual machines or operating systems may define stage 2 translation data which maps the set of intermediate addresses used by a given operating system or virtual machine to the physical addresses actually referring to locations in the memory system (different sets of stage 2 translation data can be defined for different operating systems or virtual machines).

At least some examples provide an apparatus comprising:
processing circuitry to perform data processing in response to instructions; and
address translation circuitry to perform two-stage address translation to translate a virtual address to a physical address, where a mapping of the virtual address to the physical address depends on stage 1 translation data for mapping the virtual address to an intermediate address and stage 2 translation data for mapping the intermediate address to the physical address; in which:
in response to a first type of translation lookaside buffer (TLB) invalidation instruction specifying a target intermediate address, the processing circuitry is configured to issue a first TLB invalidation command to at least one TLB for storing translation entries derived from at least one of the stage 1 translation data and the stage 2 translation data, the first TLB invalidation command requesting that said at least one TLB invalidates a translation entry which satisfies a first set of one or more invalidation conditions, the first set including an intermediate-address-based condition which is satisfied when the translation entry corresponds to the target intermediate address; and
in response to a second type of TLB invalidation instruction, the processing circuitry is configured to issue a second TLB invalidation command requesting that:
if said at least one TLB includes a first type of TLB, the first type of TLB should invalidate one or more translation entries which satisfy a second set of one or more invalidation conditions, where said first type of TLB is a type of TLB which is configured to ignore the first TLB invalidation command and which is configured to store combined stage-1-and-2 entries which depend on both the stage 1 translation data and the stage 2 translation data; and
if said at least one TLB includes a second type of TLB other than said first type of TLB, the second type of TLB should retain one or more translation entries which satisfy the second set of one or more invalidation conditions.

At least some examples provide an apparatus comprising:
means for performing data processing in response to instructions; and
means for translating a virtual address to a physical address using two-stage address translation, where a mapping of the virtual address to the physical address depends on stage 1 translation data for mapping the virtual address to an intermediate address and stage 2 translation data for mapping the intermediate address to the physical address; in which:
in response to a first type of translation lookaside buffer (TLB) invalidation instruction specifying a target intermediate address, the means for performing data processing is configured to issue a first TLB invalidation command to at least one TLB for storing translation entries derived from at least one of the stage 1 translation data and the stage 2 translation data, the first TLB invalidation command requesting that said at least one TLB invalidates a translation entry which satisfies a first set of one or more invalidation conditions, the first set including an intermediate-address-based condition which is satisfied when the translation entry corresponds to the target intermediate address; and
in response to a second type of TLB invalidation instruction, the means for data processing is configured to issue a second TLB invalidation command requesting that:
if said at least one TLB includes a first type of TLB, the first type of TLB should invalidate one or more translation entries which satisfy a second set of one or more invalidation conditions, where said first type of TLB is a type of TLB which is configured to ignore the first TLB invalidation command and which is configured to store combined stage-1-and-2 entries which depend on both the stage 1 translation data and the stage 2 translation data; and
if said at least one TLB includes a second type of TLB other than said first type of TLB, the second type of TLB should retain one or more translation entries which satisfy the second set of one or more invalidation conditions.

At least some examples provide a method for an apparatus comprising processing circuitry to perform data processing in response to instructions, and address translation circuitry to perform two-stage address translation to translate a virtual address to a physical address, where a mapping of the virtual address to the physical address depends on stage 1 translation data for mapping the virtual address to an intermediate address and stage 2 translation data for mapping the intermediate address to the physical address;
the method comprising:
in response to a first type of translation lookaside buffer (TLB) invalidation instruction specifying a target intermediate address, issuing a first TLB invalidation command to at least one TLB for storing translation entries derived from at least one of the stage 1 translation data and the stage 2 translation data, the first TLB invalidation command requesting that said at least one TLB invalidates a translation entry which satisfies a first set of one or more invalidation conditions, the first set including an intermediate-address-based condition which is satisfied when the translation entry corresponds to the target intermediate address; and in response to a second type of TLB invalidation instruction, issuing a second TLB invalidation command requesting that:

if said at least one TLB includes a first type of TLB, the first type of TLB should invalidate one or more translation entries which satisfy a second set of one or more invalidation conditions, where said first type of TLB is a type of TLB which is configured to ignore the first TLB invalidation command and which is configured to store combined stage-1-and-2 entries which depend on both the stage 1 translation data and the stage 2 translation data; and if said at least one TLB includes a second type of TLB other than said first type of TLB, the second type of TLB should retain one or more translation entries which satisfy the second set of one or more invalidation conditions.

Further aspects, features and advantages of the present technique will be apparent from the following description of examples, which is to be read in conjunction with the accompanying drawings, in which.

In a system having address translation circuitry supporting two-stage address translation, the stage 1 translation data and stage 2 translation data may ultimately be stored within page table structures stored within the memory system. However, accessing those page table structures may be slow, as it may require multiple memory accesses in a page table walk through multiple levels of page table structure, and so it is common to provide translation lookaside buffers (TLBs) for caching translation entries which depend on the stage 1 or stage 2 translation data from the page table structures. The TLB may be provided local to the point at which the address translation circuitry is located and can be accessed faster than the page table structures themselves. The TLBs may cache translation entries for a subset of addresses which have been recently accessed or which are predicted to be accessed in future, which helps to improve performance.

However, when software updates the page table structures in memory then this means that some out of date translation entries can still reside within TLBs. Therefore, processing circuitry for performing data processing in response to instructions may support at least one type of TLB invalidation instruction which may trigger the processing circuitry to issue an invalidation command to at least one TLB to request that translation entries meeting a given set of invalidation conditions are invalidated from the TLB. Different types of TLB invalidation instruction may impose different invalidation conditions.

A first type of TLB invalidation instruction may specify a target intermediate address, and in response to the first type of TLB invalidation instruction, the processing circuitry may issue a first TLB invalidation command to at least one TLB. The first TLB invalidation command may request that the at least one TLB invalidates a translation entry which satisfies a first set of one or more invalidation conditions, including at least an intermediate-address-based condition which is satisfied when the translation entry corresponds to a target intermediate address specified by the first type of TLB invalidation instruction. Such an instruction can be useful for dealing with scenarios where software updates the address mappings for certain addresses within the stage 2 translation data. By providing a form of instruction which can specify a particular target intermediate address for which TLB entries are to be invalidated, this means it is not necessary to invalidate all stage 2 translation entries, which limits the performance impact of the invalidation.

However, TLBs may be implemented in different ways in a system in which the address translation circuitry supports two-stage address translation, and not all types of TLB may be able to look up their translation entries based on the target intermediate address. Therefore the first type of TLB invalidation instruction may not be able to ensure that all TLBs will invalidate any entries which depend on stage 2 translation data relating to the target intermediate address. For example, the TLB could be a type of TLB which stores combined stage-1-and-2 entries which depend on both the stage 1 translation data and the stage 2 translation data. Such combined stage-1-and-2 entries may map a virtual address directly to a physical address without specifying the corresponding intermediate address, and so it may not be possible to query such entries based on intermediate address, even though such entries would need to be invalidated when the stage 2 translation data associated with the intermediate address changes, as the mapping from the virtual address to the physical address does depend on that stage 2 translation data. Hence, this first type of TLB may be configured to ignore the first TLB invalidation command.

To deal with this, one alternative approach may be that following issuing of the first type of TLB invalidation instruction which invalidates by target intermediate address, a second TLB invalidation instruction could be issued which simply specifies that all TLB entries which meet a certain set of invalidation conditions should be invalidated, where the invalidation conditions of that type of TLB invalidation instruction do not depend on an address at all. For example this could be an instruction specifying that any entries which depend on stage 1 translation data associated with a particular translation context should be invalidated. While this may be successful in enabling the first type of TLB to invalidate any combined stage-1-and-2 entries which depend on the relevant stage 2 translation data which changed for the targeted intermediate address specified by the preceding first type of TLB invalidation instruction, this has the downside that also many other entries of TLBs which depend on stage 1 translation data would be invalidated, even if they do not actually relate to the addresses for which the stage 2 translation data changed. This over-invalidation does not affect functional correctness, but can have an impact on performance, since memory accesses which rely on the unnecessarily invalidated translation entries will then need to wait for the relevant translation data to be re-fetched from page table structures, which is slow.

For some TLBs, this over-invalidation may not be considered a problem. For example, for TLBs provided within a central processing unit (CPU), it may be considered that as stage 2 invalidations may be extremely rare, the performance impacts of over-invalidation when a stage 2 invalidation is required may be acceptable, as for such CPUs typically it may be assumed that an occasional instance of bad performance can be tolerated if the average performance over a period of time is acceptable, since the poor performance for some memory accesses may be compensated for by other accesses which have much faster performance.

However, the inventor recognised that this assumption is not true for all devices using TLBs. For some devices, a more significant criterion than average performance may be the worst case performance achieved for any memory access. For example, for a display controller which needs to process each frame of image data sufficiently fast that the frame is ready to display by the end of the refresh period for refreshing the display, there may be little benefit to sometimes exceeding the average performance since in any case the display of the frame would have to wait until the end of the next refresh period. However, in cases where the worst case performance is encountered, if this worst case performance is too slow, this may cause cycles in which the display goes blank because the image data is not processed sufficiently fast to display before the end of the refresh period. For such devices, even if stage 2 invalidations are extremely rare, drastic over-invalidation of stage 1 TLB entries caused by the alternative approach described above may be a significant problem.

In the techniques discussed below, in addition to the first type of TLB invalidation instruction which invalidates by target intermediate address, a second type of TLB invalidation instruction is also provided. In response to the second type of TLB invalidation instruction, the processing circuitry issues a second TLB invalidation command which requests that:

if the at least one TLB includes a first type of TLB, the first type of TLB should invalidate one or more translation entries which satisfy a second set of one or more invalidation conditions. The first type of TLB is a type of TLB which ignores the first TLB invalidation command and stores combined stage-1-and-2 entries which depend on both the stage 1 translation data and the stage 2 translation data; and if the at least one TLB includes a second type of TLB other than the first type of TLB, the second type of TLB should retain one or more translation entries which satisfy the second set of one or more invalidation conditions.

Hence, a type of TLB invalidation instruction is provided which targets the specific first type of TLB which stores combined stage-1-and-2 entries but which ignores the first type of TLB invalidation command because it cannot query by target intermediate address. Hence, for any TLBs of the first type, the second type of TLB invalidation instruction requires the first type of TLB to invalidate any entries which match the second set of one or more invalidation conditions. However, for a second type of TLB other than the first type, that second type of TLB may retain its translation entries following receipt of the second TLB invalidation command, even if those translation entries do satisfy the second set of one or more invalidation conditions.

Hence, those TLBs which are able to observe the first type of TLB invalidation instruction or which store split stage 1 and stage 2 translation data, and so which are able to deal with stage 2 invalidations precisely without needing to over-invalidate other entries that are unrelated to the specified target intermediate address, can ignore the second type of TLB invalidation instruction and so this limits the performance impact of ensuring that all entries affected by an update of stage 2 translation data are invalidated. It is only the first type of the TLB that was not able to observe the first type of TLB invalidation command but nevertheless has combined stage 1 and 2 entries which has to invalidate based on the second set of one or more invalidation conditions.

As well as helping to improve performance, the support for the second type of TLB invalidation instruction also gives system designers the flexibility to vary the type of TLB provided in a particular device, to balance whether a less area efficient TLB design is chosen which provides better performance on stage 2 invalidations, or whether a more area efficient form of TLB may be preferred even if that causes worse performance on stage 2 invalidations. For example, the TLB within a memory management unit which is expected to be used with a display controller or other performance sensitive device may implement a type of TLB which is able to observe the first type of TLB invalidation instruction, and so it would not need to invalidate in response to the second type of TLB invalidation instruction, to preserve the performance in the worst case scenarios. However, a TLB within a memory management unit for a CPU could choose to implement a first type of TLB which is not able to observe the first type of invalidation command, but for which it may be acceptable to tolerate the performance impact of potential over-invalidation in response to the second TLB invalidation command, with the advantage of this approach being that the first type of TLB may be more area efficient since it is not necessary to expend circuit area and power budget on circuit logic which is able to detect which combined stage-1-and-2 entries correspond to a given target intermediate address. Therefore, providing architectural support in the processor for both the first and second types of TLB invalidation instruction has the benefit of enabling system designers to have much greater flexibility in their design choices for their TLBs.

The different types of TLB invalidation instructions could be distinguished in different ways. In some implementations the first and second types of TLB invalidation instruction may have different instruction opcodes. Alternatively, the different types of TLB invalidation instruction could have the same opcode but may specify another parameter which identifies the type of TLB invalidation instruction, or a set of two or more parameters which collectively identify the type. Another option could be that the instruction encoding of the first and second types of TLB invalidation instruction is in fact exactly the same, but when decoding these instructions the processing circuitry references control data within a control register, which identifies the specific type of TLB invalidation instruction that is intended to be executed. This control data may be set by an earlier instruction executed before the TLB invalidation instruction.

The first type of TLB which is targeted by the second TLB invalidation command may be a type of TLB which is incapable of determining whether a given combined stage-1-and-2 entry corresponds to the target intermediate.

On the other hand, the second type of TLB, which ignores the second TLB invalidation command, may be at least one of: a stage-1-only TLB for which the translation entries depend on the stage 1 translation data and are independent of the stage 2 translation data; a stage-2-only TLB for which the translation entries depend on the stage 2 translation data and are independent of the stage 1 translation data; or a combined stage-1-and-2 TLB configured to store said combined stage-1-and-2 entries, which is capable of determining whether said combined stage-1-and-2 entries correspond to the target intermediate address.

For the stage-1-only TLB, this TLB may ignore the second type of TLB invalidation command because it is expected that the second type of TLB invalidation instruction is used for invalidation of a stage 2 translation entry and as the stage 1 only TLB does not store any entries dependent on the stage 2 translation data then it does not need to observe the second TLB invalidation command. On the other hand for the stage-2-only TLB or the combined stage-1-and-2 TLB which is capable of determining whether combined entries correspond to the target intermediate address, these do not need to observe the second TLB invalidation command because they would already have been able to invalidate any required entries which correspond to the target intermediate address in response to the first type of TLB invalidation instruction.

Hence, in general any combined stage-1-and-2 TLB may be designed by the system designer to either be of the first type or of the second type, so that any combined TLB will be responsive to either the first TLB invalidation instruction (for the second type of TLB) or the second type of TLB invalidation instruction (for the first type of TLB). Either way, a sequence of instructions including at least one TLB invalidation instruction of the first type and one TLB invalidation of the second type may then be sufficient to ensure that all translation entries which depend on updated stage 2 translation data are invalidated.

For the second type of TLB invalidation instruction, the second set of one or more invalidation conditions may include at least one context-based condition which is satisfied by a translation entry for which at least one translation context identifier specified by the translation entry matches at least one target translation context identifier. For example, translation entries may specify translation context identifiers which may be used to distinguish between different sets of page table data used for different software processes, to ensure that entries from one process are not looked up when an access is made from another process. For example the translation context identifier could be one or more of: a virtual machine identifier, a security state identifier, and an exception level identifier. Hence, the second type of TLB invalidation instruction may specify some combination of one or more translation context identifiers for which entries are to be invalidated. The specified translation context identifier could be either defined by an operand specified by the second type of TLB invalidation instruction, or could be dependent on a current operating state of the processing circuitry at the time of executing the second type of TLB invalidation instruction (in this case, it may be implicit that the specified translation context identifier for the second type of TLB invalidation instruction is the translation context identifier relating to the current operating state of the processing circuitry, rather than using explicit identification in an operand of the instruction). Regardless of which of these options is used, by including in the second set of one or more invalidation conditions for the second type of TLB invalidation instruction a context-based condition, this means the performance impact of potential over-invalidation of entries (when trying to ensure that a stage 2 invalidation reaches all affected entries) is limited to those entries associated with the relevant translation context for which the stage 2 translation data was updated.

The second set of one or more invalidation conditions may not include any address-based condition. Hence the checking of whether a given TLB's translation entry satisfies the second set of one or more invalidation conditions may be independent of the address fields for specifying a virtual or intermediate address within the TLB. This is because the second type of TLB invalidation instruction is intended to catch those TLBs which were not able to do an address-based invalidation query in response to the first type of TLB invalidation instruction, and so the relevant TLB entries to invalidate cannot be identified by address. Instead, a catch all invalidation which may be limited by other parameters such as translation context, but is independent of address, may be performed.

On the other hand, for the first type of TLB invalidation instruction the first set of one or more invalidation conditions includes at least an address-based condition based on target intermediate address as discussed above. However, the first set of one or more invalidation conditions could be also expanded to include at least one context-based condition which is satisfied by a translation entry for which at least one translation context identifier specified by the translation entry matches at least one target translation context identifier. The translation context identifiers may be any of the types of translation context identifier discussed above, and could be specified either by an operand of the instruction or determined implicitly based on the current operating state of the processing circuitry when executing the first type of TLB invalidation instruction.

It will be appreciated that, for both the first and second types of TLB invalidation instructions, the respective first and second sets of invalidation conditions could also be expanded to include other conditions. Also, for each of these types of TLB invalidation instruction it is possible to provide a number of variants of the instruction which have different sets of invalidation conditions.

In addition to the first and second types of TLB invalidation instruction as discussed above, the processing circuitry may also be responsive to a third type of TLB invalidation instruction, which controls the processing circuitry to issue a third TLB invalidation command requesting that the at least one TLB invalidates all translation entries which depend on the stage 1 translation data and which specify at least one translation context identifier matching at least one target translation identifier. Again, for the third type of TLB invalidation instruction the invalidation conditions may be independent of address. Such as catch all TLB invalidation which invalidates all stage 1 translation data relating to a particular set of one or more translation context identifiers may be supported for the purpose of supporting stage 1 invalidations performed when stage 1 page tables for a given translation context are updated, as well as for supporting legacy code which may already have been written to follow a TLB invalidation instruction of the first type with a catch all invalidation by translation context identifier in order to ensure that all stage 2 related entries for a given intermediate address are invalidated even in TLBs which do not support lookups by intermediate address. However, for a newer code which is written to use the second type of TLB invalidation instruction, it is not necessary to use the third type of TLB invalidation instruction and this will tend to improve performance by avoiding over-invalidation in stage 1 only TLBs or combined stage-1-and-2 TLBs which are capable of looking up by intermediate address.

As mentioned above, one form of TLB of the second type may be an intermediate-address-tracking combined stage-1-and-2 TLB which stores combined stage 1-and-2 entries and is capable of determining whether the combined stage-1-and-2 entries correspond to the target intermediate address. For example, each translation entry of the intermediate-address-tracking combined stage-1-and-2 TLB may specify both a virtual-to-physical address mapping and a corresponding intermediate address. For example, each entry may have fields for all of the virtual, intermediate, and physical addresses. Hence, while such a TLB would, in response to a translation request specifying a virtual address, be able to map the virtual address directly to the physical address without needing a second lookup in a stage 2 TLB from intermediate address to physical address, it can also query its entries based on the intermediate address and so can observe the first type of TLB invalidation command.

Such an intermediate-address-tracking combined stage-1-and-2 TLB may be able to observe the first invalidation command in different ways. One relatively simple approach may be that each first TLB invalidation command triggers the relevant invalidation of entries satisfying the first set of invalidation conditions at the time of receiving the first TLB invalidation command itself. Hence, each time a first TLB invalidation command is received specifying an intermediate address, the intermediate-address-tracking combined stage-1-and-2 TLB may walk through each of its translation entries to check whether each entry satisfies the first set of invalidation conditions and invalidate those entries which do satisfy the first set of invalidation conditions.

However, it may be relatively common for several first TLB invalidation instructions to be executed in succession specifying different intermediate addresses for which the invalidation is to be performed. If each first type of TLB invalidation instruction causes the intermediate-address-tracking combined stage-1-and-2 TLB to perform a separate walk through its entries to find entries which meet the first set of invalidation conditions of the corresponding instruction, then this may have are relatively significant performance and power consumption impact since there may be multiple walks through the TLB in response to the overall sequence of TLB invalidation instructions.

Another approach can be that the intermediate-address-tracking combined stage-1-and-2 TLB may observe the first invalidation command by performing the invalidation lazily, in the expectation that a number of invalidation commands of the first type may eventually be followed by a TLB invalidation command of the second type. In this case, then in response to the first TLB invalidation command, the intermediate-address-tracking combined stage-1-and-2 TLB may update tracking information based on a first set of invalidation conditions specified by the first TLB invalidation command. If there are multiple first TLB invalidation commands, then each time one is received the tracking information may further be updated based on the first set of invalidation instructions for the latest received TLB invalidation command, so that over time the tracking information tracks the sets of first invalidation conditions for each of the received first TLB invalidation commands. Then, in response to the second TLB invalidation command, although that command itself is instructing an invalidation which does not need to be observed by the intermediate-address-tracking combined stage-1-and-2 TLB (because the second TLB invalidation command is intended to target those combined stage-1-and-2 TLBs which were not able to observe the first TLB invalidation command), the intermediate-address-tracking combined stage-one-and-two TLB may nevertheless use the second TLB invalidation command as a signal that the sequence of first TLB invalidation commands is complete and then respond by triggering invalidation of one or more of its combined translation entries which satisfy the tracked set of invalidation conditions represented by the tracking information. By deferring the actual invalidation instructed by the series of first TLB invalidation commands so it is performed at the time of receiving the second TLB invalidation command, then this allows the invalidations required from the first TLB invalidation commands to be implemented by just a single walk through the translation entries of the intermediate-address-tracking combined stage-1-and-2 TLB, which can check as it walks through each entry whether that entry meets any of the sets of invalidation conditions represented by the tracked invalidations conditions in the tracking information. This eliminates a number of redundant walks through the TLB, and hence saves power and improves performance by making the TLB available for subsequent lookups sooner.

Hence, when it is stated above that a type of TLB is able to observe the first type of TLB invalidation command, this does not necessarily mean that it must actually trigger its invalidation directly in response to that command, as some types of TLB may be able to store tracking information and defer acting upon the invalidations until later when the second TLB invalidation command is received.

In some examples, even if the second TLB invalidation command is not received, the tracking structure may have a capacity limit, and so if the number of received first TLB invalidation commands exceeds a threshold, the invalidations represented by the tracking structure could also be applied to the TLB.

The tracking information for such an approach could be maintained in different ways. In some cases the tracking information may precisely track the first set of invalidation conditions specified by a series of one or more first TLB invalidation commands. For example the tracking information could maintain an address list tracking all the target intermediate addresses specified by each of the series of first TLB invalidation commands. The tracking information could also track one or more translation context identifiers associated with those first TLB invalidation commands. It may often be expected that in a series of one or more first TLB invalidation commands which precede a second TLB invalidation command, all of those first TLB invalidation commands should have invalidation conditions which specify the same set of one or more translation context identifiers, so the tracking information may not need to record more than one set of translation context identifiers. By precisely tracking the invalidation conditions of the series the first TLB invalidation commands, this ensures there is no over-invalidation of entries which would not have satisfied the first set of invalidation conditions specified by any of the series of received first TLB invalidation commands.

In another approach, the tracking information may comprise a filter representation which imprecisely tracks the first set of invalidation conditions of a series of one or more TLB invalidation commands. This may mean that the translation entries which satisfy the tracked set of invalidation conditions are allowed to include at least one translation entry which would not have satisfied the first set of invalidation conditions specified by any of the received series of one or more first TLB invalidation commands which were used to update the tracking information. While this may allow some over-invalidation, it allows a more efficient circuit implementation of logic for storing and updating the tracking information. For example a Bloom filter could be used to track the intermediate addresses for each of the received first TLB invalidation commands, which can allow the addresses to be recorded using fewer bits of tracking information.

The first and second types of TLB invalidation instruction defined above may be architectural instructions supported by an instruction set architecture which is implemented for the processing circuitry. These may be native instructions supported by the instruction decoder which decodes the instructions to be processed by the processing circuitry. It will be appreciated that the processing circuitry which supports such an architecture, so that it can execute the first and second type of invalidation instructions may be provided even in a system which does not actually have any TLBs of the second type. The same software may be executed across a range of system designs using different types of TLB, and so it is useful for the processing circuitry to support specific types of TLB invalidation instruction which are used to ensure correct functioning on either a system that has the first type of TLB or on a system which does not have the first type of TLB. The presence of at least one TLB of the first type is therefore not essential for implementing the processor which has processing circuitry which supports the first and second type of TLB invalidation instructions as discussed above. Similarly, the presence of a specific TLB of the second type is also not required. In general the system may have TLBs of a range of types and the specific types chosen may be a design choice for the system designer. The architectural support for the first and second types of TLB invalidation instructions enables the flexibility of choice for the system designer to select the type of TLB based on the performance and area requirements of a given device or memory management unit which uses the TLB.

Figure 1:
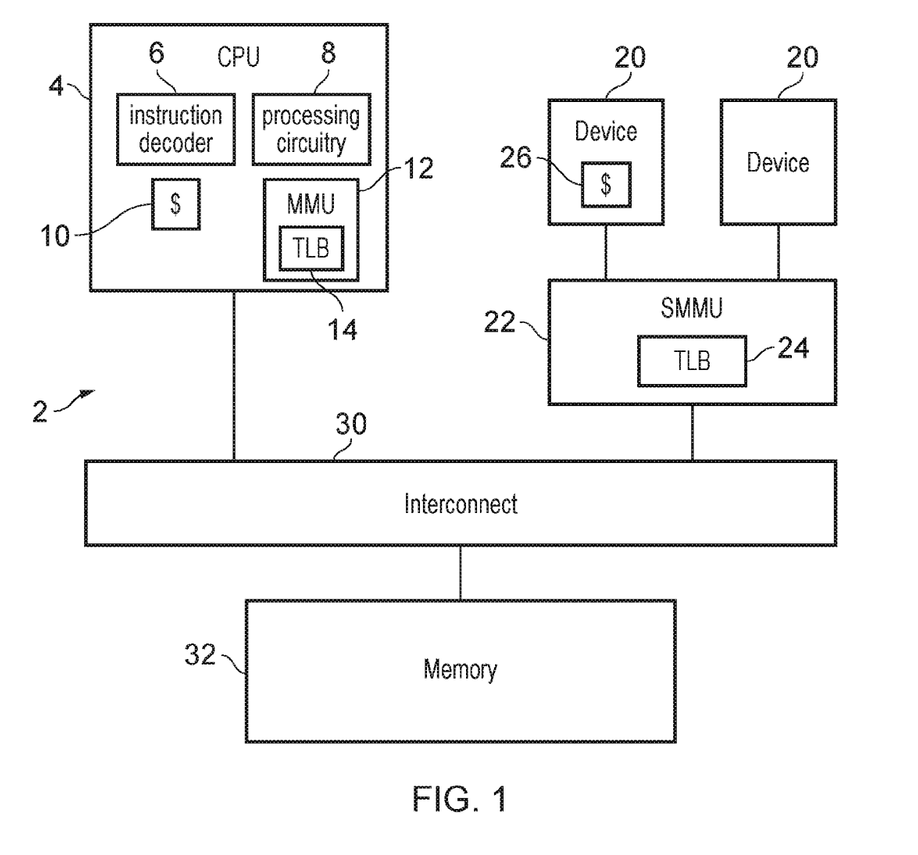
FIG. 1 schematically illustrates an example of a data processing system having one or more translation lookaside buffers.

FIG. 1 schematically illustrates an example of a data processing system 2 having at least one CPU (Central Processing Unit) 4 which has an instruction decoder 6 for decoding program instructions and processing circuitry 8 which is controlled to perform processing operations in response to the instructions decoded by the instruction decoder 6. The CPU 4 has a cache 10 for caching data from memory for faster access by the CPU and has a memory management unit (MMU) 12 which functions as address translation circuitry for translating virtual addresses specified by instructions executed by the CPU 4 into physical addresses identifying locations within the memory system. The MMU may have at least one TLB 14 for storing translation entries which depend on page table data from page table structures stored in the memory system. The page table structures define the address mappings between virtual and physical addresses and may also define memory access permissions which may define whether certain software processes executing on the CPU 4 are allowed to access certain addresses. The MMU 12 may support 2-stage address translation where the mapping of a virtual address to a physical address depends on both stage 1 address translation data which maps the virtual address (VA) to an intermediate physical address (IPA) and stage 2 translation data which maps the IPA to a physical address (PA). The stage 1 address translation data may be set by an operating system or virtual machine. The stage 2 translation data may be set by a hypervisor.

The CPU 4 is an example of a master device which is capable of executing program instructions. While FIG. 1 only shows one such master device, it will be appreciated that system 2 could have two or more such devices, which may include further CPUs or could include other types of instruction execution devices such as a graphics processing unit (GPU).

In addition to the CPU 4 or other devices capable of instruction execution which have their own internal MMU 12, the system may also include master devices 20 which may not have an internal MMU, and so for accessing memory and providing address translation functionality, such devices may communicate with the rest of the system via a system memory management unit (SMMU) 22 which includes address translation circuitry which controls address translation and memory permissions based on translation data defined in page table structures in memory. Again, the SMMU 22 may have one or more TLBs 24 which have a similar functionality to the TLBs 14 within the MMU 12 of the CPU 4. The devices 20 which access memory via the SMMU 22 can include cached devices which include an internal cache 26 and uncached devices which do not have any cache. For example, a device 20 could include a display controller for controlling display of image frames on display, a network controller for controlling input or output of data via a network, a hardware accelerator for performing certain dedicated processing functions in a more efficient manner than can be achieved using software executing on a generic processor such as the CPU 4, and so on.

All of the master devices 4, 20 communicate with each other via an interconnect 30 which is responsible for routing transactions between the master devices and the memory system 32. Interconnect 30 may also be responsible for managing coherency between data cached in respective caches 10, 26 of the system. It will be appreciated that FIG. 1 is a simplified diagram and the system 2 may have many other components not shown in FIG. 1 for conciseness.

Figure 2:
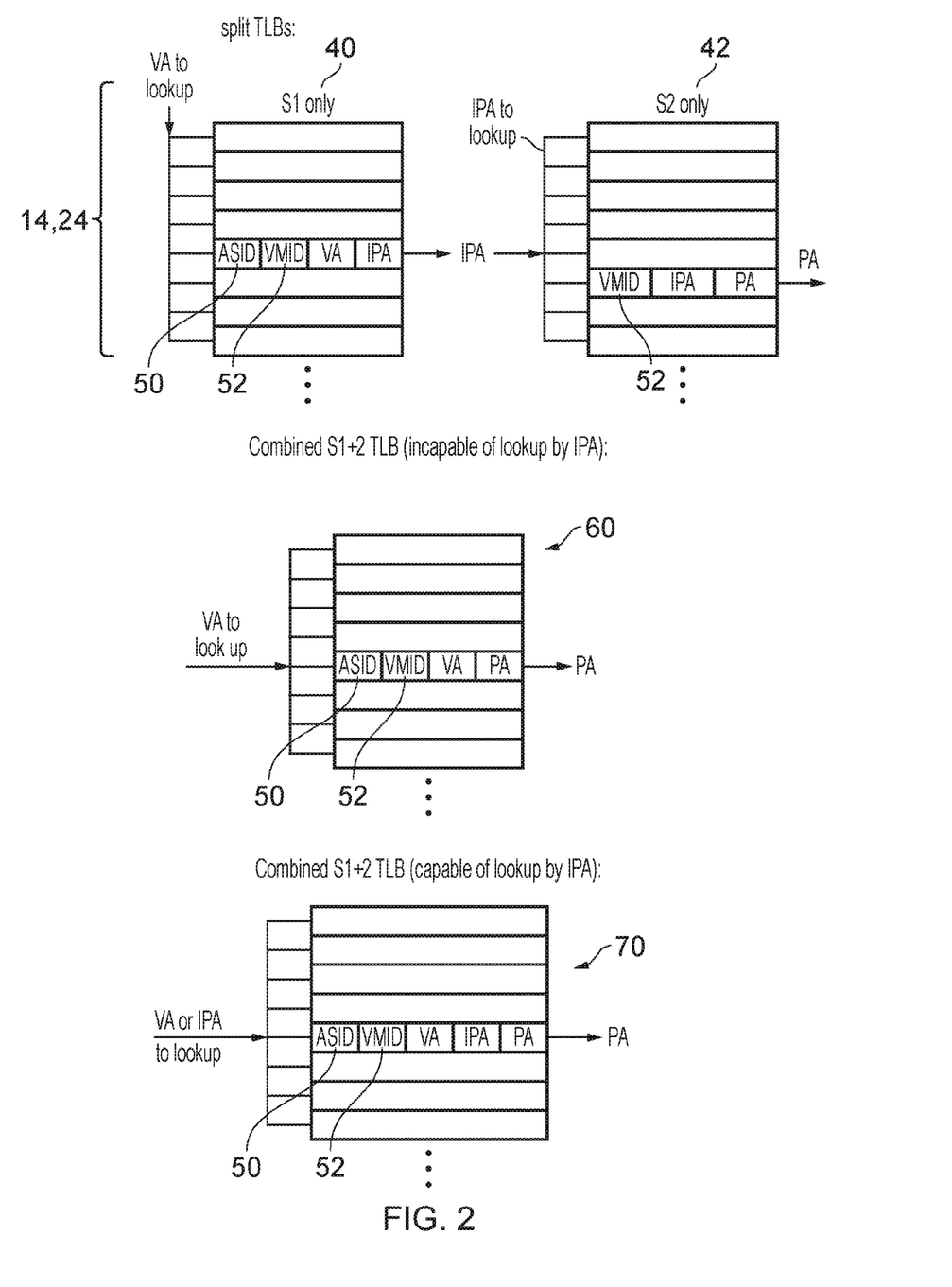
FIG. 2 schematically illustrates different types of translation lookaside buffer.

As shown in FIG. 1, the system 2 may include a number of TLBs 14, 24. These TLBs may include TLBs of different types. Any one implementation of the system 2 may not have all of these types of TLBs and which types are provided may depend on the design choices made by the system designer. FIG. 2 summarises some different types of TLBs.

As shown at the top of FIG. 2, one option for TLBs supporting 2 stage address translation may be to split the TLB 14, 24 into two separate TLBs: one stage 1 only TLB 40 and one stage 2 only TLB 42. The stage 1 only TLB 40 can be looked up based on a supplied virtual address and when it contains a matching entry for that virtual address maps the virtual address to a corresponding intermediate address (IPA). The stage 2 only TLB 42 is able to look up its entries based on an input IPA and when the TLB contains an entry matching that IPA is able to output a corresponding physical address (PA) that corresponds to that IPA. Hence, with such split TLBs 14, 24, to translate a virtual address to a physical address requires two separate lookups, one in the stage 1 only TLB 40 and one in the stage 2 only TLB 42. As shown in both the stage 1 and stage 2 only TLBs 40, 42, each entry may be qualified by a set of context identifiers which represent the translation context for which the corresponding address mapping is stored. Each translation context may have a separate page table structure stored in memory defining address mappings, and which context is used may depend on the current operating state of the CPU 4 or other masters when it is issuing memory access transactions. For example, different applications may be associated with different address space identifiers (ASID) to distinguish their respective access permissions and address mappings. Similarly, different virtual machines or operating systems may be associated with respective virtual machine identifiers (VMID) to allow respective page table structures to be accessed. Hence, when looking up the TLB, the context identifier (or several such identifiers) may also be provided as an input to the TLB and only entries matching the supplied set of context identifiers may be returned as a hit. For a stage 1 only TLB each entry may be tagged with both the ASID 50 and the VMID 52 whereas for the stage 2 only TLB 42 only the VMID 52 may be recorded because for stage 2 translations the relevant page table data is not associated with an individual application and so the ASID is not relevant (all processes with different ASIDs controlled by the same virtual machine may share the same stage 2 translation data). While not shown in FIG. 2, it is also possible for TLB lookups to be qualified by other translation context identifiers such as current exception (privilege) level or security state of the requesting master.

As shown in the middle part of FIG. 2, another approach can be to provide a combined stage 1 and 2 TLB 60 which enables a virtual address to be mapped directly to a physical address without having to do two separate TLB lookups. With the combined stage 1 and 2 TLB 60 shown in FIG. 2, the IPA via which the virtual address was translated into a physical address is not actually recorded in each translation entry. Hence, each translation entry may store the ASID 50 and VMID 52 and the VA and PA of the corresponding address mapping, but may not store any indication of the IPA. When such a combined TLB populates its translation entries, then to derive the VA to PA mapping this will require page table walks from both the stage 1 translation data in a first set of page tables and the stage 2 translation data in a second set of page tables. Once both sets of translation data have been accessed then the relevant PA can be identified and then the VA to PA mapping recorded in the combined TLB so that next time the same VA has access and the PA can be obtained directly without needing to access the page tables again. This type of TLB is more efficient in hardware and in performance since it only requires one TLB lookup to obtain the PA in cases when there is a hit in the TLB 60. However, it does mean that this type of TLB is incapable of doing a TLB lookup to find whether it contains an entry relating to a particular IPA, which impacts on stage 2 page table updates and associated TLB invalidations.

The bottom part of FIG. 2 shows a third type of TLB 70 which is a combined stage 1 and 2 TLB which is capable of lookups by IPA. In a similar way to the example of the combined stage 1 and 2 TLB 60, again each entry tracks the ASID 50, VMID 52, VA and PA but this time there is also a field for the IPA. On regular TLB lookups for translating a VA to a PA, the IPA field is not used as the VA can be mapped directly to the PA using the VA and PA fields. However, the extra circuit logic for storing the IPA and extra lookup control logic for querying whether a given entry matches a particular IPA may be justified in some scenarios if it is desired to support invalidation commands which require invalidation of entries matching a particular IPA or set of IPAs.

Figure 3:
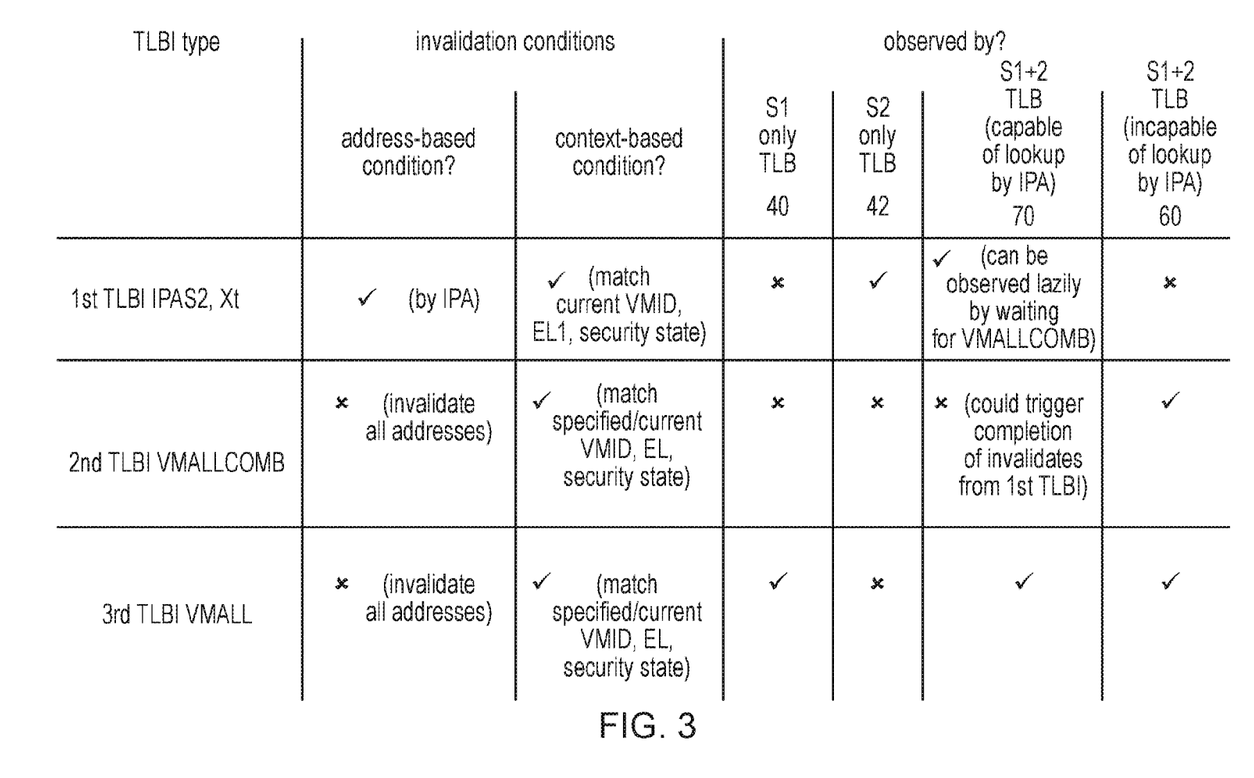
FIG. 3 is a table summarising properties of different types of translation lookaside buffer invalidation instruction.

FIG. 3 summarises three different types of TLB invalidation instruction which may be supported by the instruction decoder 6 and processing circuitry 8 of the CPU 4. When any of these TLB invalidation instructions (TLBI) are executed, the processing circuitry 8 is controlled to issue a TLB invalidation command to a set of one or more TLBs 14, 24 within the processing system 2. In some systems different flavours of TLB invalidation instruction may be defined which define different parts of the processing system within which the TLBs need to be invalidated, so it is not necessary for every TLB invalidation instruction to cause an invalidation command to be sent to every TLB within the system. Nevertheless, there may be a set of TLBs which is sent the TLB invalidation command when the TLB invalidation instruction is executed, which may include TLBs in other master devices or TLBs within the SMMU 22.

Such TLB invalidation instructions may be useful to ensure that after the stage 1 or stage 2 address translation data in the page tables in memory have been updated, TLBs cannot continue to retain out of date translation data which has since been updated.

Sometimes the hypervisor which controls the stage 2 translation data may update the address mappings for only a portion of the intermediate address space. While one approach for ensuring that TLBs do not continue to store out of date data could be simply to broadcast a blanket stage 2 invalidation which requires the TLBs to invalidate translation data depending on the stage 2 page tables associated with a particular set of context IDs 50, 52, this may over-invalidate many unnecessary entries which did not actually relate to intermediate addresses which were subject to the address mapping update.

To allow more targeted invalidations of translation entries in TLBs which depend on updated stage 2 translation data, a TLB instruction is provided which limits the entries to be invalidated based on a specified intermediate address (IPA). The first type of TLB instruction shown in FIG. 3 provides such an intermediate-address-based invalidation condition. This type of TLB invalidation instruction specifies a target intermediate address, e.g. by specifying a register Xt storing the intermediate address. In this example, the invalidation conditions for this instruction include: an address-based condition, that the translation entry relates to an address mapping associated with the specified target intermediate address, and a context-based condition, satisfied when any translation context identifiers associated with the translation entry to be invalidated match a number of specified translation context identifiers, which may include any one or more of virtual machine identifier, exception level and security state. The specified target translation context identifiers to match against the corresponding identifiers of the entries to be invalidated in the TLBs may be specified either within operands of the TLB invalidation instruction or may be implicit based on the current operating state of the CPU 4 when it executes the instruction. Hence, when the first type of TLB invalidation instruction is executed, this controls the processing circuitry 8 to issue a first TLB invalidation command to a set of one or more TLBs 14, 24. This first TLB invalidation command requests that the TLB invalidates any entry which matches the first set of invalidation conditions, which includes both the address-based condition based on matching of the intermediate address specified by the instruction and that they match a context-based condition based on various target translation context identifiers.

While this type of TLB invalidation instruction can be useful for enabling invalidation of stage 2 related entries which correspond to a specific intermediate address, not all types of TLB may be able to observe this type of invalidation. The stage 1 only TLBs 40 can ignore this type of TLB invalidation command, because their entries only depend on stage 1 translation data and are independent of stage 2 translation data, and so any update to stage 2 translation data would not affect the validity of any translation entries cached in the stage 1 only TLB 40. The stage 2 only TLB 42 and both types of combined stage 1 and 2 TLBs 60, 70 can contain entries which do depend on stage 2 translation data and so it would be required for such TLBs to invalidate some of their entries if underlying stage 2 translation data has been updated. For the stage 2 only TLB 42 and the type of combined TLB 70 which is capable of lookups by intermediate address, the first TLB invalidation command can be observed by those TLBs, as it is possible to identify which entries of those TLBs 42, 70 map to the target intermediate address. Therefore the stage 2 only TLB 42 and the combined TLB capable of lookup by intermediate address 70 do respond to the first TLB invalidation command and invalidate any other entries which match the first set of invalidation conditions (including both the address-based condition and the context-based condition). Note that for the combined TLB which is capable of lookup by intermediate address 70, the observation of the first TLB invalidation command can be done lazily and so the invalidation does not necessarily need to be done at the time of receiving this command, as it can be done by storing tracking information relating to the first TLB invalidation command and then subsequently doing the invalidation at a later stage in response to a further TLB invalidation command, as will be discussed more with respect to FIG. 4.

However, for the type of combined stage 1 and 2 TLB 60 which is incapable of looking up its entries based on an intermediate address, it is not possible to determine whether such a TLB has any entries which relate to the target intermediate address specified by the first type of TLB invalidation instruction. Therefore, in practice, the first type of TLB invalidation instruction alone may not be enough to ensure that none of the TLBs contain TLB entries which depend on the out of date stage 2 translation data.

As shown in FIG. 3, the instruction decoder 6 and processing circuitry 8 may also support a third type of TLB invalidation instruction, VMALL, which requires any TLB which is capable of holding TLB entries dependent on stage 1 translation data to invalidate any of its entries that match a context-based invalidation condition based on matching of translation context identifiers (including VMID, and optionally other identifiers such as security state or exception level), but which has its invalidation conditions independent of any address-based invalidation condition, so that there is no need to check against addresses. The third type of TLB invalidation instruction may be observed by the stage 1 only TLB 40 and both types of combined TLBs 60, 70. This third type of TLB invalidation instruction causes the processing circuitry 8 to issue a third invalidation command which does not need to be observed by the stage 2 only TLB 42 because it does not store any entries relating to stage 1 translation data.

Hence, one approach for ensuring that a stage 2 invalidation correctly invalidates any TLB entries which depend on stage 2 translation data relating to a particular IPA may be to follow a TLB invalidation instruction of the first type (or a series of such first type of TLB invalidation instructions) with a subsequent TLB invalidation instruction of the third type. The third type of TLB instruction may be intended to catch any entries within the combined stage 1 and 2 TLBs 60 which is incapable of looking up by intermediate address but which could depend on the out of date translation data from the stage 2 page tables. However, a side effect of this third type of TLB invalidation instruction is that it may also result in many stage 1 TLB entries being invalidated even if they have nothing to do with the IPA for which the first type of TLBI instruction was executed.

In systems supporting only the first and third types of TLB invalidation instructions, it may be considered that the performance impact of the third type of TLB invalidation instruction when carrying out stage 2 invalidations by IPA may be acceptable in some scenarios because stage 2 invalidation may be extremely rare and the average performance over a period of time may still be acceptable. For application CPUs 4 this may be acceptable as if in the majority of cases performance is good then it may be acceptable to incur the occasional bad performance caused by flushing the TLB of stage 1 related entries and hence incurring a performance hit when fetching back entries in again.

However, this ignores the effect on real-time performance which may be important in particular for some of the devices 20 which interact with the SMMU 22. For real-time-critical devices, it may be that the worst case performance is a more important factor than the average performance. Even in non real-time devices some devices may still be performance sensitive. An example of such a device may be a display controller for which it is important that the level of performance achieved in each frame display cycle is sufficient that the frame of image data is ready for display by the end of the cycle to allow the display controller to keep up with the frame refresh rate being used. Hence, even if stage 2 invalidation are rare, for such performance sensitive devices the occasional flushing of many stage 1 related entries unnecessarily by the third type of TLB invalidation instruction may have a significant performance impact. This may be particularly the case because such performance sensitive devices may use strategies such as prefetching of page table information ahead of time, before the time when those translations are actually required by the device for an actual address translation for a memory access. The benefits of such prefetching may be significantly limited if there are blanket stage 1 address translations by virtual machine IDs, such as in response to the third type of TLB invalidation instruction, which may be enough to ensure that the display controller cannot meet its performance demands imposed by the frame refresh rate and hence may result in the user seeing a blank screen for some display cycles.

To address these issues, as shown in FIG. 3 the instruction decoder 6 and the processing circuitry 8 may also support a second type of TLB invalidation instruction, VMALL-COMB, which specifies a set of invalidation conditions which is independent of any address-based condition but includes a context-based condition which requires matching of a set of translation context identifiers associated with a given translation entry in the TLB with a specified set of translation context identifiers. Again these translation context identifiers could be virtual machine ID, exception level and/or security states of the CPU 4. The target translation context identifiers sought when the matching against the TLB entries could either be specified in an operand of the instruction or could be implicit based on the current operating state of the CPU 4 when it executes instruction. Hence, the invalidation conditions themselves specified by the second type of instruction may actually be the same as those invalidation conditions specified by the third type of TLB invalidation instruction. However, the second type of TLB invalidation instruction differs in that it targets a more limited subset of types of TLBs. In response to the second type of TLB invalidation instruction, the instruction decoder 6 controls the processing circuitry 8 to issue a second TLB invalidation command to the relevant set of TLBs 14, 24 which could be subject to the invalidation. If any of these TLBs are of either the stage 1 only type 40, the stage 2 only type 42 or the combined stage 1 and 2 type 70 which is capable of lookup by intermediate address, then the second invalidation command can be ignored. The second invalidation command only needs to be observed by the type of combined stage 1 and 2 TLB 60 which is incapable of looking up its entries based on an intermediate address. By limiting the effect of the second type of TLB invalidation instruction to only those types of combined stage 1 and 2 TLB 60 which are incapable of responding to the first type of TLB invalidation instruction, this greatly reduces the chances of over-invalidation, since it avoids the blanket invalidation of many stage 1 related entries within stage 1 only TLBs 40 or combined TLBs capable of looking up by intermediate physical address 70, which would otherwise be performed if the third type of TLB invalidation instruction is used. Hence, to carry out a stage 2 invalidation, in a system supporting the second type of TLB invalidation instruction, the programmer or the compiler may define a set of instructions which include one or more TLB invalidation instructions of the first type (TLBI IPAS2) followed by a TLB invalidation instruction of the second type (TLBI VMALLCOMB) to mop up any remaining stage 2 related entries in the combined stage 1 and 2 TLB 60 incapable of looking up by IPA, which were unable to be invalidated by the first type of TLB invalidation instruction. This greatly reduces the performance impact especially for real time critical or performance sensitive devices.

Hence, a system designer when designing combined stage 1 and 2 TLBs can choose which type 60, 70 of combined TLB is used depending on the needs of the associated master device. For a TLB 14 within a CPU 4 where the performance impact of over-invalidation by the third type of TLB invalidation instruction may be less of a problem, it may be preferred to use the type 60 of TLB which is incapable of looking up by intermediate address, to save circuit area by eliminating the storage cells and lookup logic for tracking intermediate addresses. However for the TLB 24 within the SMMU 22 the designer may prefer to use the more circuit area hungry type of TLB 70 which is capable of looking up by intermediate address, so that on stage 2 invalidations they can respond to the first type of TLB invalidation instruction and so need not over-invalidate entries when the second type of TLB invalidation instruction is executed.

For the type of TLB 70 which stores combined stage 1 and 2 entries and is capable of looking up its entries by intermediate address, the observation of the first TLB invalidation command can be achieved in different ways. One option can be that the first TLB invalidation operations precisely invalidate the required TLB entries at the time of receiving the TLB invalidation command from the CPU 4, and in this case the second type of TLB invalidation command triggered by the second TLB invalidation instruction VMALLCOMB can be completely ignored. This approach can be relatively simple to implement, however as each invalidation operation may require a walk through every entry of the TLB to check whether it matches the invalidation conditions, then if the program executed a series of 2 or more TLB invalidation instructions of the first type specifying different intermediate addresses, this may require many separate walks of the TLB which may have performance and power impact.

Figure 4:
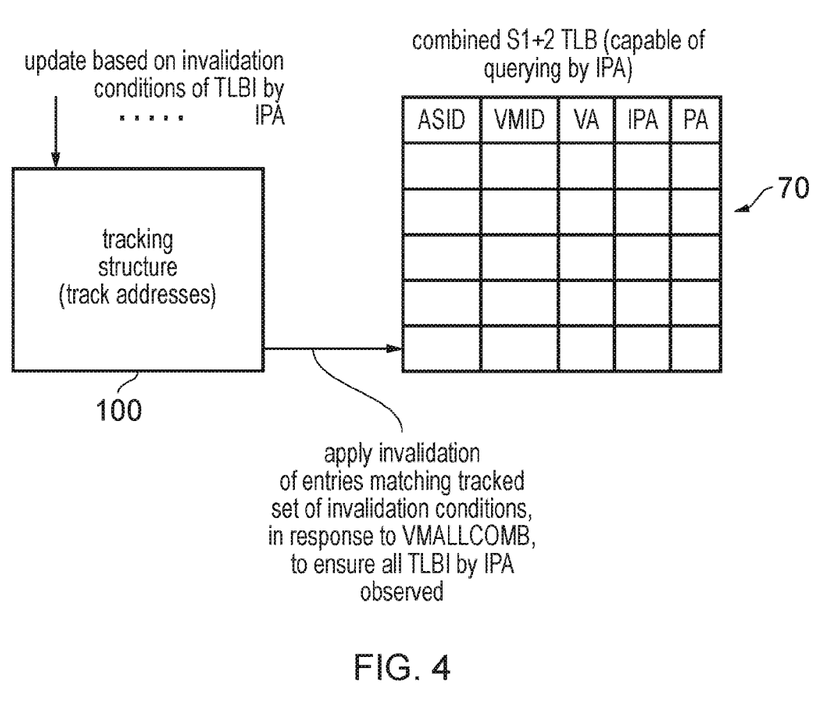
FIG. 4 schematically illustrates an example of tracking invalidation conditions from a series of translation lookaside buffer invalidation instructions within a tracking structure so that a single walk through the translation lookaside buffer can implement all of the respective sets of invalidation conditions for the series of instructions.

A second approach can be that the invalidations for the first TLB invalidation instruction are deferred until a subsequent TLB invalidation command triggered by the second type of instruction has been received by the TLB. As shown in FIG. 4 a tracking structure 100 can be provided in association with the type of TLB 70 which is capable of looking up by IPA. When a first TLB invalidation command is received which does have to be observed by this type of TLB 70, then rather than doing the invalidation right away, the tracking structure is simply updated to record an indication of the invalidation conditions associated with that first TLB invalidation command, including an indication of the intermediate address. If multiple TLB instructions of the first type are executed then each time the corresponding first TLB invalidation command is received by the combined TLB 70, it updates its tracking structure 100 based on the latest set of invalidation conditions for the received TLB invalidation command. Subsequently, when the second type of TLB invalidation instruction is executed and the combined TLB 70 receives a corresponding second TLB invalidation command, this can be used as the trigger to then walk through all the entries of the TLB 70, to check whether each of those entries matches any of the sets of invalidation conditions tracked in the tracking structure 100, and then to invalidate those entries which do match one of those sets of invalidation conditions. This means that all of the invalidations for each of the executed first type of TLB invalidation instruction can be implemented with a single walk through the TLB 70.

The tracking structure 100 can be implemented in different ways. Generally it may be expected that in a series of successive TLB invalidation instructions of the first type, they may all relate to the same set of translation context IDs and so only a single set of translation context storage entries may be required to track the context identifiers of each of the set of invalidation instructions, but separate entries may be needed to track the respective intermediate addresses specified by the series of instructions. In some cases the tracking structure could simply be a list of the intermediate addresses of the received invalidation operations which may then all be checked against each entry once the second type of TLB invalidation command is received. In some cases the number of addresses which can be tracked in the tracking structure 100 may be limited to some maximum number so even if no second type of TLB invalidation instruction has yet been executed, eventually once the maximum number is reached or exceeded then this may also be used as a trigger to apply the invalidations tracked by the tracking structure to the combined type of TLB 70, to invalidate the relevant entries which match any of the intermediate physical addresses and the sets of translation context identifiers specified by the previous invalidation operations.

On the other hand, it is also possible for the tracking structure 100 to use an imprecise filter such as a Bloom filter to track the intermediate addresses of the pending first TLB invalidation commands, and then once either the second TLB invalidation command (VMALLCOMB) is received or the maximum number of first TLB invalidation commands has been reached, then the combined TLB 70 may invalidate any of its entries which have intermediate addresses which match the representation stored in the filter. This approach has the potential to over-invalidate entries since the filter representation may be constructed so that, while it is impossible to provide a false negative (TLB entries for any address used to update the filter will be considered to match against the filter representation) it may be possible for the filter to identify a false positive where an address other than one of the intermediate addresses which was used to update the tracking filter structure is considered to match against the filter, and so an unnecessary invalidation of an additional TLB entry may be performed which was not strictly required by the first TLB invalidation commands received. While there may be some over-invalidation of entries this may involve fewer entries than if the third type of TLB invalidation instruction had been executed. The use of a filter may allow the overhead of the tracking structure to be reduced (incurring less circuit area and power than a precise tracking structure).

Other types of combined stage 1 and 2 TLB 70 which are capable of lookup by IPA 70 may prefer not to use this tracking approach and instead just walk the TLB each time a first TLB invalidation command is received, to look for any entry that matches the required intermediate address.

Figure 5:
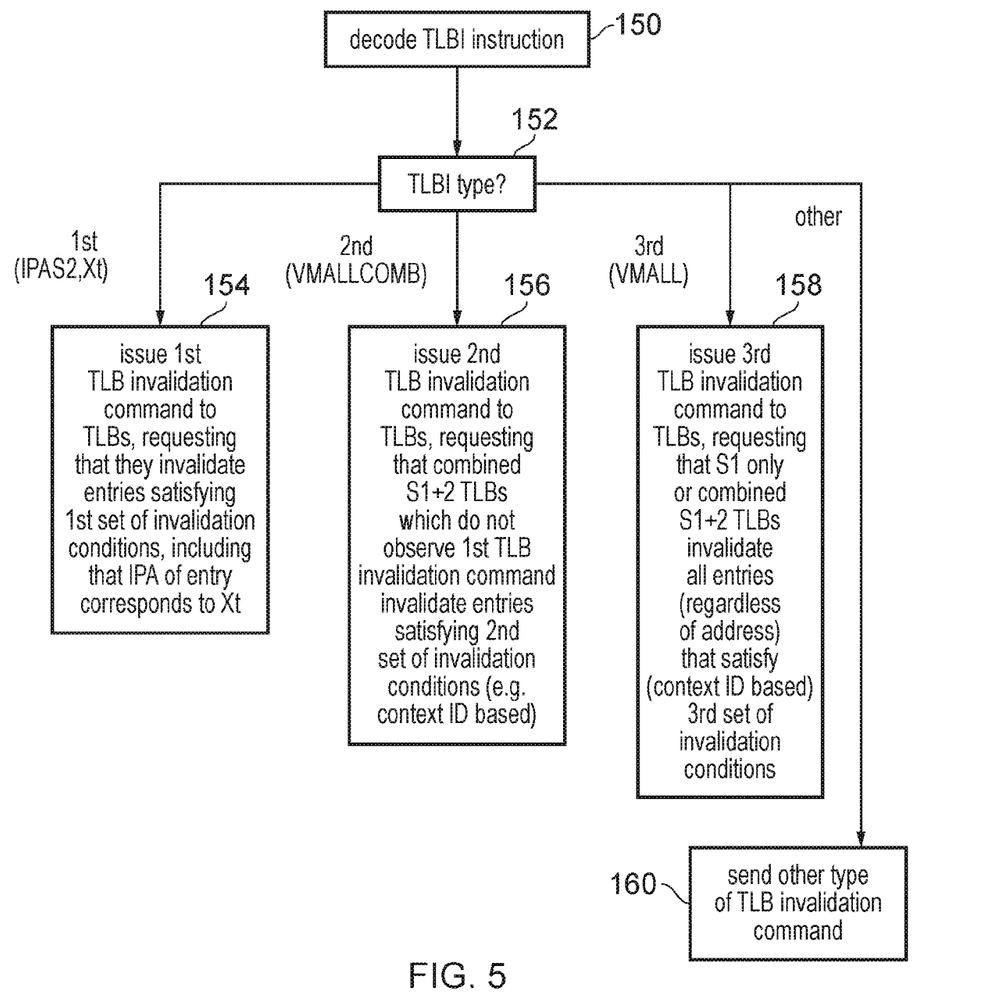
FIG. 5 is a flow diagram showing a method of processing a translation lookaside buffer invalidation instruction.

FIG. 5 is a flow diagram showing a method of processing TLB invalidation instructions at the CPU 4. At step 150 the instruction decoder 6 decodes a TLB invalidation instruction. At step 152 the instruction decoder 6 identifies the type of TLB invalidation instruction to be executed. The type could be identified based on the opcode of the instruction, or based on another parameter specified in the instruction encoding, or based on a parameter stored in a control register of the CPU 4, which may be updated in response to earlier instructions controlled by software for example. Another example could be that the type of TLB invalidation instruction is influenced by a preceding instruction which prefixes the TLB instruction and modifies the type of a subsequent TLB invalidation instruction.

If the instruction decoder 6 identifies that the TLB invalidation instruction is of a first type as shown in FIG. 3, at step 154 the instruction decoder 6 controls the processing circuitry 8 to issue a first TLB invalidation command to TLBs 14, 24. The first TLB invalidation command requests that the TLBs invalidate entries satisfying a first set of invalidation conditions, which includes a condition that the intermediate address corresponding to the entry to be invalidated corresponds to a specified target intermediate address which is identified in an operand of the instruction, for example by referencing a register Xt which contains the target address. Although the first TLB invalidation command is issued to TLBs, not all TLBs may be able to observe the command, for example the combined TLB 60 which is incapable of looking up by intermediate address may not be able to respond and so is allowed to ignore the first TLB invalidation command.

If the TLB invalidation instruction was identified as a second type (VMALLCOMB) then at step 156 the instruction decoder 6 controls the processing circuitry 8 to issue a second TLB invalidation command to the TLBs 14, 24, which request that combined stage 1 and 2 TLBs 60 which do not observe the first TLB invalidation command should invalidate entries which satisfy a second set of invalidation conditions. This second set of invalidation conditions may be based on context identifier matching but may be independent of any address-based comparison. Hence this second type of TLB invalidation command enables those TLBs which could not observe the first TLB invalidation command to invalidate relevant entries which could have been subject to a stage 2 translation data update.

If at step 152 the instruction decoder 6 identified that the TLB invalidation instruction was of the third type then at step 158 the instruction decoder 6 controls the processing circuitry 8 to issue a third TLB invalidation command TLBs 14, 24. The third TLB invalidation command requests that stage 1 only TLBs 40 or combined stage 1 and 2 TLBs 60 and 70 invalidate all entries, regardless of address, that satisfy a third set of invalidation conditions which depends on a translation context identifier comparison between a specified set of target translation context identifiers and a set of translation context identifiers associated with the TLB entries. The third TLB invalidation command will cause a greater impact on performance than the second TLB invalidation command because more types of TLBs are affected by it.

The instruction decoder may also support other types of TLB invalidation instruction not specifically shown in FIG. 3. For any other type of TLB instruction, at step 160 the instruction decoder 6 controls the processing circuitry 8 to send another type of TLB invalidation command which controls TLBs to apply some other set of invalidation conditions for deciding which entries need to be invalidated.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions; and
address translation circuitry to perform two-stage address translation to translate a virtual address to a physical address, where a mapping of the virtual address to the physical address depends on stage 1 translation data for mapping the virtual address to an intermediate address and stage 2 translation data for mapping the intermediate address to the physical address; in which:
in response to a first type of translation lookaside buffer (TLB) invalidation instruction specifying a target intermediate address, the processing circuitry is configured to issue a first TLB invalidation command to at least one TLB for storing translation entries derived from at least one of the stage 1 translation data and the stage 2 translation data, the first TLB invalidation command requesting that said at least one TLB invalidates a translation entry stored in said at least one TLB, wherein the translation entry satisfies a first set of one or more invalidation conditions, the first set including an intermediate-address-based condition which is satisfied when the translation entry corresponds to the target intermediate address; and,
in response to a second type of TLB invalidation instruction, the processing circuitry is configured to issue a second TLB invalidation command requesting that:
if said at least one TLB includes a first type of TLB, the first type of TLB should invalidate one or more translation entries included in the first type of TLB which satisfy a second set of one or more invalidation conditions, where said first type of TLB is a type of TLB which is configured to ignore the first TLB invalidation command and which is configured to store combined stage-1-and-2 entries specifying virtual-to-physical address translation mappings which depend on both the stage 1 translation data and the stage 2 translation data; and,
if said at least one TLB includes a second type of TLB other than said first type of TLB, the second type of TLB should retain one or more translation entries included in the second type of TLB which satisfy the second set of one or more invalidation conditions, where the second type of TLB is configured to store translation entries specifying at least one of: virtual-to-physical address translation mappings, virtual-to-intermediate address translation mappings, or intermediate-to-physical address translation mappings.

2. The apparatus according to claim 1, in which said first type of TLB is a type of TLB which is incapable of determining whether said combined stage-1-and-2 entries correspond to the target intermediate address.

3. The apparatus according to claim 1, in which said second type of TLB comprises at least one of:

a stage-1-only TLB for which the translation entries depend on the stage 1 translation data and are independent of the stage 2 translation data;

a stage-2-only TLB for which the translation entries depend on the stage 2 translation data and are independent of the stage 1 translation data; or, a combined stage-1-and-2 TLB configured to store said combined stage-1-and-2 entries, which is capable of determining whether said combined stage-1-and-2 entries correspond to the target intermediate address.

4. The apparatus according to claim 1, in which the second set of one or more invalidation conditions include at least one context-based condition which is satisfied by a translation entry for which at least one translation context identifier specified by the translation entry matches at least one target translation context identifier.

5. The apparatus according to claim 4, in which the second set of one or more invalidation conditions does not include an address-based condition.

6. The apparatus according to claim 4, in which the at least one translation context identifier comprises one or more of:
a virtual machine identifier;
a security state identifier; and,
an exception level identifier.

7. The apparatus according to claim 4, in which each target translation context identifier comprises one of:
a translation context identifier specified by an operand of the second type of TLB invalidation instruction; and,
a translation context identifier dependent on a current operating state of the processing circuitry at a time of executing the second type of TLB invalidation instruction.

8. The apparatus according to claim 1, in which:
in response to a third type of TLB invalidation instruction, the processing circuitry is configured to issue a third TLB invalidation command requesting that said at least one TLB invalidates all translation entries which depend on the stage 1 translation data and which specify at least one translation context identifier matching at least one target translation context identifier.

9. The apparatus according to claim 1, comprising at least one TLB of the second type, which is an intermediate-address-tracking combined stage-1-and-2 TLB configured to store said combined stage-1-and-2 entries, which is capable of determining whether said combined stage-1-and-2 entries correspond to the target intermediate address.

10. The apparatus according to claim 9, in which each translation entry of said intermediate-address-tracking combined stage-1-and-2 TLB specifies a virtual-to-physical address mapping and a corresponding intermediate address.

11. The apparatus according to claim 9, in which said intermediate-address-tracking combined stage-1-and-2 TLB is configured to observe the first TLB invalidation command by triggering, in response to the first TLB invalidation command, invalidation of said one or more translation entries which satisfy the first set of invalidation conditions.

12. The apparatus according to claim 9, in which said intermediate-address-tracking combined stage-1-and-2 TLB is configured to observe the first TLB invalidation command by:
in response to the first TLB invalidation command, updating tracking information based on said first set of invalidation conditions; and
in response to the second TLB invalidation command or detecting that the number of received first TLB invalidation commands exceeds a threshold, triggering invalidation of one or more translation entries which satisfy a tracked set of invalidation conditions represented by the tracking information.

13. The apparatus according to claim 12, in which the tracking information precisely tracks the first set of invalidation conditions specified by a series of one or more first TLB invalidation commands.

14. The apparatus according to claim 12, in which the tracking information comprises a filter representation which imprecisely tracks the first set of invalidation conditions specified by a series of one or more first TLB invalidation commands, so that the translation entries which satisfy the tracked set of invalidation conditions are allowed to include at least one translation entry which would not have satisfied the first set of invalidation conditions specified by any of the series of one or more first TLB invalidation commands.

15. The apparatus according to claim 1, comprising at least one TLB of the first type.

16. The apparatus according to claim 1, comprising at least one TLB of the second type.

17. An apparatus comprising:
processing circuitry to perform data processing in response to instructions; and
address translation circuitry to perform two-stage address translation to translate a virtual address to a physical address, where a mapping of the virtual address to the physical address depends on stage 1 translation data for mapping the virtual address to an intermediate address and stage 2 translation data for mapping the intermediate address to the physical address; in which:
in response to a first type of translation lookaside buffer (TLB) invalidation instruction specifying a target intermediate address, the processing circuitry is configured to issue a first TLB invalidation command to at least one TLB for storing translation entries derived from at least one of the stage 1 translation data and the stage 2 translation data, the first TLB invalidation command requesting that said at least one TLB invalidates a translation entry which satisfies a first set of one or more invalidation conditions, the first set including an intermediate-address-based condition which is satisfied when the translation entry corresponds to the target intermediate address; and,
in response to a second type of TLB invalidation instruction, the processing circuitry is configured to issue a second TLB invalidation command requesting that:
if said at least one TLB includes a first type of TLB, the first type of TLB should invalidate one or more translation entries which satisfy a second set of one or more invalidation conditions, where said first type of TLB is a type of TLB which is configured to ignore the first TLB invalidation command and which is configured to store combined stage-1-and-2 entries which depend on both the stage 1 translation data and the stage 2 translation data; and,
if said at least one TLB includes a second type of TLB other than said first type of TLB, the second type of TLB should retain one or more translation entries which satisfy the second set of one or more invalidation conditions;
in which the first set of one or more invalidation conditions include at least one context-based condition which is satisfied by a translation entry for which at least one translation context identifier specified by the translation entry matches at least one target translation context identifier.

18. A method for an apparatus comprising processing circuitry to perform data processing in response to instructions, and address translation circuitry to perform two-stage address translation to translate a virtual address to a physical address, where a mapping of the virtual address to the physical address depends on stage 1 translation data for mapping the virtual address to an intermediate address and stage 2 translation data for mapping the intermediate address to the physical address;

the method comprising:

in response to a first type of translation lookaside buffer (TLB) invalidation instruction specifying a target intermediate address, issuing a first TLB invalidation command to at least one TLB for storing translation entries derived from at least one of the stage 1 translation data and the stage 2 translation data, the first TLB invalidation command requesting that said at least one TLB invalidates a translation entry stored in said at least one TLB, wherein the translation entry satisfies a first set of one or more invalidation conditions, the first set including an intermediate-address-based condition which is satisfied when the translation entry corresponds to the target intermediate address; and, in response to a second type of TLB invalidation instruction, issuing a second TLB invalidation command requesting that:

if said at least one TLB includes a first type of TLB, the first type of TLB should invalidate one or more translation entries included in the first type of TLB which satisfy a second set of one or more invalidation conditions, where said first type of TLB is a type of TLB which is configured to ignore the first TLB invalidation command and which is configured to store combined stage-1-and-2 entries specifying virtual-to-physical address translation mappings which depend on both the stage 1 translation data and the stage 2 translation data; and, if said at least one TLB includes a second type of TLB other than said first type of TLB, the second type of TLB should retain one or more translation entries included in the second type of TLB which satisfy the second set of one or more invalidation conditions, where the second type of TLB is configured to store translation entries specifying at least one of: virtual-to-physical address translation mappings, virtual-to-intermediate address translation mappings, or intermediate-to-physical address translation mappings.

* * * * *